United States Patent [19]

Sager, Jr.

[11] Patent Number: 4,655,035

[45] Date of Patent: Apr. 7, 1987

[54] AUXILIARY AIR INJECTOR ASSEMBLY

[75] Inventor: Robert L. Sager, Jr., Grass Lake, Mich.

[73] Assignee: Tenneco Inc., Lincolnshire, Ill.

[21] Appl. No.: 754,822

[22] Filed: Jul. 12, 1985

[51] Int. Cl.⁴ .......................... F01N 3/30; F01N 7/18; F16L 5/00; F16L 25/00
[52] U.S. Cl. ...................................... 60/307; 285/199; 285/332.1
[58] Field of Search ................ 60/307; 285/199, 332.1

[56] References Cited

U.S. PATENT DOCUMENTS

| 264,936 | 9/1882 | Doolittle | 285/199 |
| 3,116,596 | 1/1964 | Boehme | 60/307 |
| 3,188,115 | 6/1965 | Morrish | 285/332.1 |

FOREIGN PATENT DOCUMENTS 547776  10/1922  France ................................. 285/199

*Primary Examiner*—Douglas Hart
*Attorney, Agent, or Firm*—Harness, Dickey & Pierce

[57] ABSTRACT

An auxiliary air injector assembly comprises an injector fitting that is held in place in a hole in an exhaust pipe by the end of an air flow tube that is clamped against it by a saddle clamp extending around the exhaust pipe.

2 Claims, 4 Drawing Figures

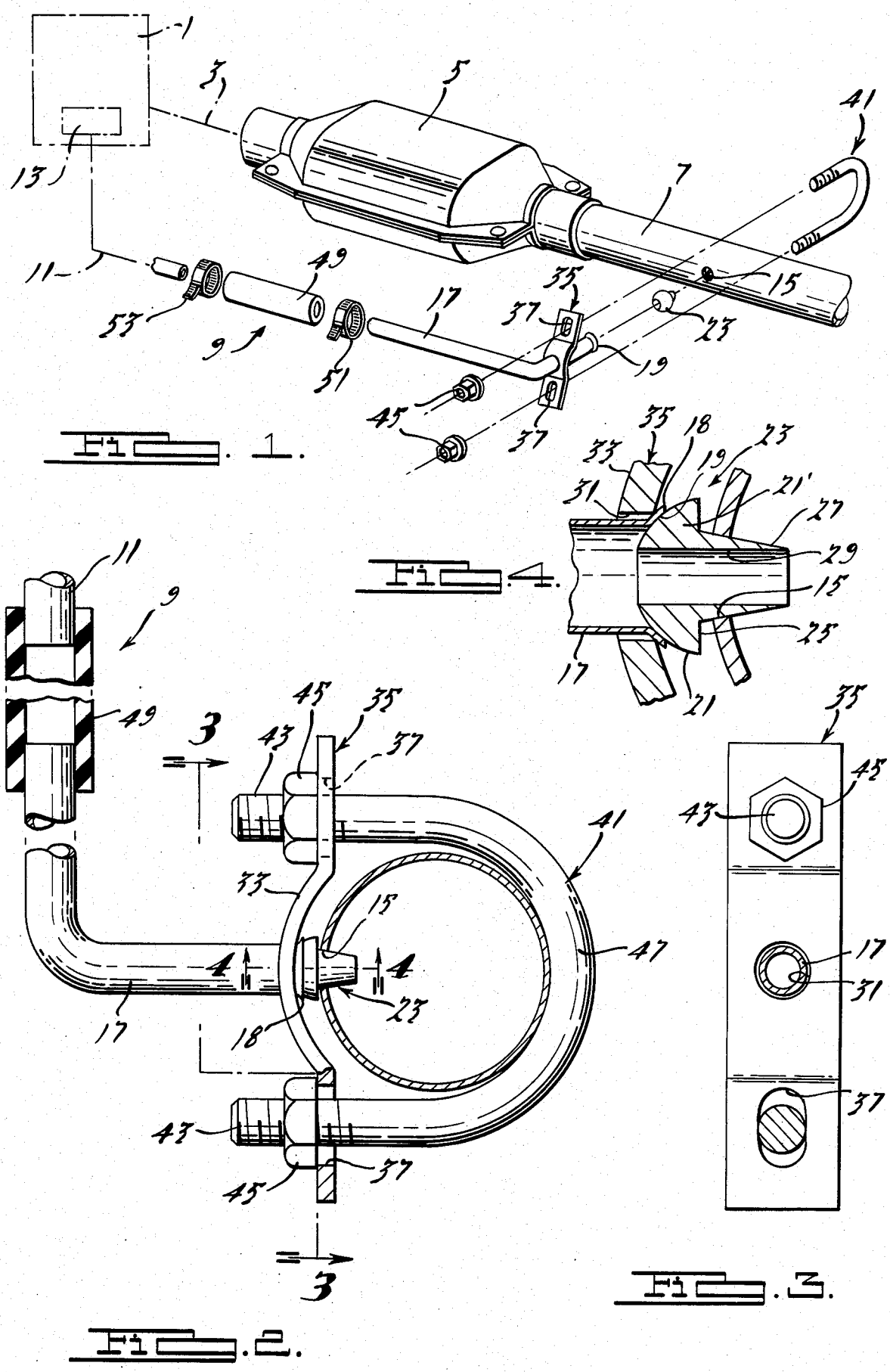

AUXILIARY AIR INJECTOR ASSEMBLY

This invention relates to auxiliary air injector assemblies for use with engine exhaust gas systems having catalytic converters.

BACKGROUND OF THE INVENTION

A large percentage of motor vehicles currently in use in the United States have combustion engine exhaust gas systems that include catalytic converters. The catalytic process for the conversion of undesired constituents in the exhaust gases which is provided by the catalytic converter often requires the injection of secondary air into the exhaust gas. In maintaining or replacing the catalytic converter part of the exhaust system it may be necessary to use an auxiliary air injection means to supply such air to the exhaust gas.

BRIEF SUMMARY OF THE INVENTION

It is the basic purpose of the present invention to provide an auxiliary air injector assembly that may be readily installed in a variety of exhaust gas systems.

In a presently preferred form, the invention comprises a hollow fitting to seat in a drilled hole in an exhaust pipe, being held on the pipe by the end of an air flow tube and a clamp that extends around the pipe. Tubing is provided to connect the air flow tube to a source of secondary air on the engine. The invention is of a construction that enables it to be used on a wide variety of different engine systems and that enables it to accommodate considerable mismatch of parts while maintaining a leak resistant connection with the pipe.

Other features will appear in connection with the detailed description set forth hereinafter.

DESCRIPTION OF THE DRAWINGS

FIG. 1 is an exploded perspective view, somewhat schematic, showing an assembly according to the invention and how it would be installed in an engine exhaust system for an automobile or other application;

FIG. 2 is an enlarged view partly in section showing the assembly in installed position;

FIG. 3 is a view taken along line 3—3 of FIG. 2; and

FIG. 4 is a cross section through the joint between the air injector fitting and the exhaust pipe as taken on line 4—4 of FIG. 2.

DESCRIPTION OF THE INVENTION

An internal combustion engine 1 has an exhaust pipe 3 carrying exhaust gases to a catalytic converter 5 which discharges the treated exhaust gases into an exhaust pipe 7 that conducts them to an acoustic muffler, etc., (not shown) forming a part of an exhaust system for the engine.

The invention provides an auxiliary air injector assembly 9 to connect the secondary air line 11, fed by secondary air pump 13 of the engine 1, to an opening 15 drilled into the exhaust pipe 7 downstream of the converter 5 and on the same side as line 11. The opening 15, for example, may be, and preferably is, 5/16" in diameter.

The assembly 9 includes a right angle section of metal tubing 17, preferably ¼" outer diameter, that is flared at its downstream end 18 to provide a concave spherical seat 19 that receives the convex annular, spherical bearing surface 21 of a steel injector fitting 23. The surface 21 is a part of a substantially semi-spherical section 21' of the fitting 23 and terminates in a flat annular flange-like face 25 that is at right angles to the axis of the fitting 23. Extending downstream from the face 25 is a conical or tapered fitting section 27 that fits in the opening 15. An air flow passage 29 extends through the fitting 23, i.e., through sections 21 and 27.

The right angle tube 17 extends through an opening 31 in a central curve portion 33 of a steel saddle clamp member 35, the opening 31 being smaller in diameter than the flared end 18 of the tube. The clamp member 35 has fastener receiving openings 37 in it on opposite sides of portion 33 which are elongated to accommodate dimensional irregularities. The fastener is preferably a steel U-bolt 41 having threaded end legs 43 on which nuts 45 are threaded to clamp the curved portion 47 of the U-bolt 41 against the outside of pipe 7 as shown in FIG. 2. It is apparent that the clamp assembly composed of the member 35 and the U-bolt assembly (U-bolt 41 and nuts 45) can be used with pipes 7 of a variety of different sizes.

The other end of tube 17 fits inside of a ¼" I.D. flexible hose section 49 and is clamped to it by hose clamp 51. The upstream end of hose section 49 fits over the downstream end of the ¼" O.D. secondary air pipe 11 and is clamped to it by a second hose clamp 53. The hose section 49 is preferably formed of silicon rubber and can easily be cut to length in the field for retrofit installation of the assembly 9.

When the saddle clamp is tightened, the curved portion 33 of clamp member 35 bears against flare 18 at the end of tube 17. The spherical seat 19 on the inside of the flare and the spherical surface 21 on the fitting 23 adjust themselves to each other and are held together in a leak resistant manner as clamp pressure is applied to force the tapered section 27 of the fitting tightly into the hole 15 in pipe 7. The taper of section 27 obviously accommodates a significant range of hole sizes wherein it will fit in a leak resistant manner. If hole 15 is too large for section 27, the face 25 will be clamped against the outside of the tube 7 and inhibit substantial leakage. This tolerance for off-size holes 15 along with the ability of the saddle clamp to accept different size pipes 7 and the easy way in which the length of the air conduit can be adjusted by cutting tube 9 to length enable the assembly 9 to be "universal" in application and able to be sold in kit form for installation on a wide range of vehicles requiring air taps for auxiliary air injection. Use of different sizes of hose and tubing will permit an even wider range of applications.

More broadly, the invention also provides a simple, non-threaded means for connecting one thin walled conduit to another in a leak resistant manner through the use of a fitting held in place in a hole in one conduit by a clamp means used to hold the two conduits together.

Modifications may be made without departing from the spirit and scope of the invention.

What is claimed is:

1. An auxiliary air injector assembly kit for replacement use to connect a secondary air line from an engine air pump to an exhaust pipe in a variety of combustion engine exhaust systems, said exhaust pipe having an auxiliary air receiving hole formed in a wall thereof, said assembly comprising a flexible conduit adapted to be readily cut to length and connected at one end to said secondary air line, a metal tube, means for connecting a first end of the metal tube to the other end of the flexible conduit, a hollow fitting with an air flow-through passage and having a conical portion adapted to fit in said hole in a leak resistant manner, said fitting having a bearing portion with a convex spherical surface located outside said exhaust pipe when said conical portion is in said hole, a second end of said metal tube having a flange with a concave spherical surface to seat against said convex spherical surface in a leak resistant manner, and clamp means for connecting said metal tube to said exhaust pipe and applying pressure on said metal tube flange against said bearing portion of said fitting to hold the fitting in the hole, said clamp means including a saddle having an opening larger than said tube but smaller than said tube flange, said tube extending through said saddle opening, said clamp means also including a U-bolt assembly for extending around the exhaust pipe and forcing the saddle against the tube flange and toward the exhaust pipe.

2. An assembly as set forth in claim 1 wherein said bearing portion of said fitting is larger in diameter than said conical portion to provide a radial shoulder on said fitting to face the exhaust pipe.

* * * * *